Aug. 9, 1966  W. S. OSTRANDER  3,265,122
AIR CONDITIONING SYSTEMS FOR INDUSTRIAL APPLICATIONS
Filed July 1, 1964
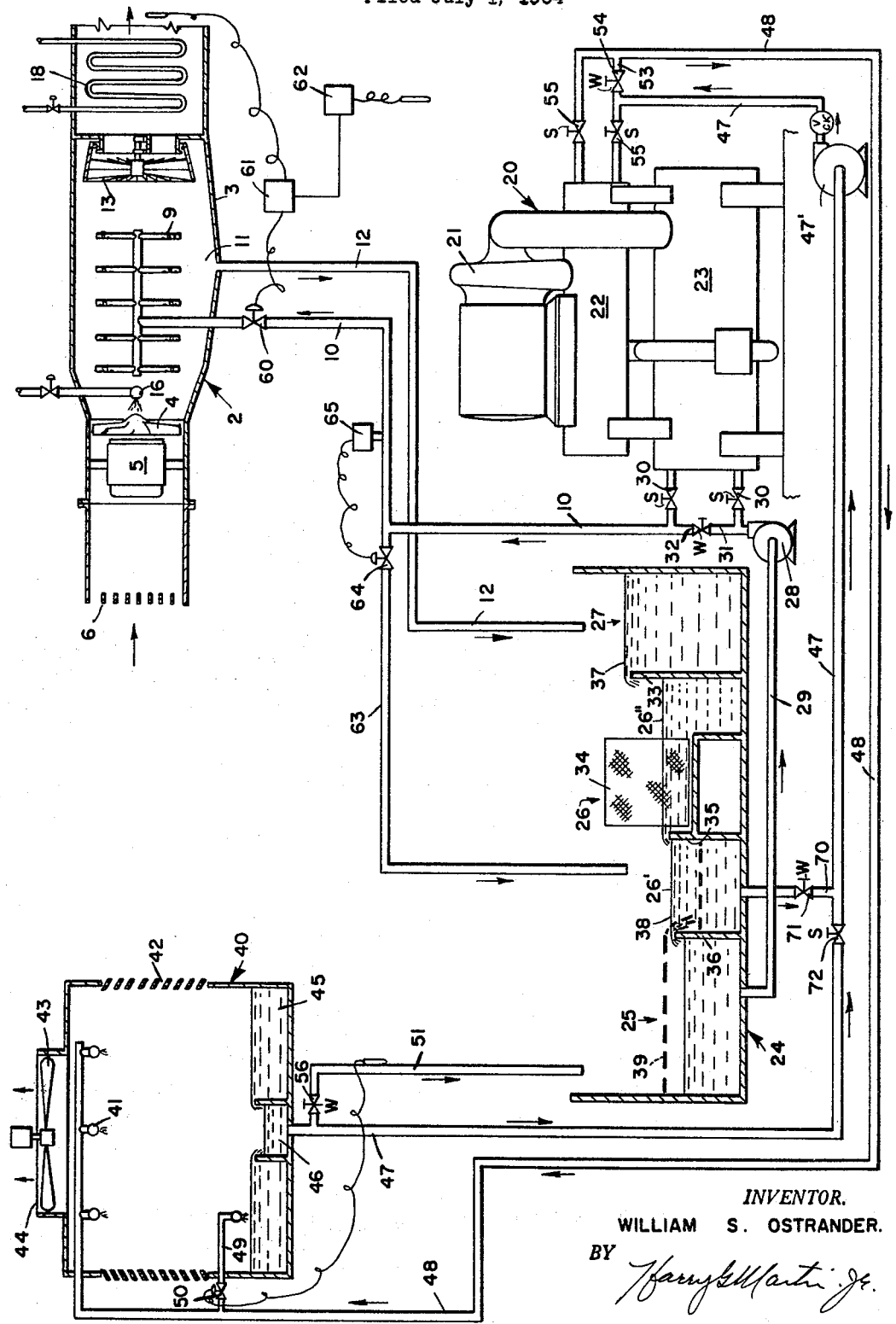
INVENTOR.
WILLIAM S. OSTRANDER.
BY
ATTORNEY.

United States Patent Office

3,265,122
Patented August 9, 1966

3,265,122
AIR CONDITIONING SYSTEMS FOR
INDUSTRIAL APPLICATIONS
William S. Ostrander, Fayetteville, N.Y., assignor to
Carrier Corporation, Syracuse, N.Y., a corporation
of Delaware
Filed July 1, 1964, Ser. No. 379,445
13 Claims. (Cl. 165—60)

This invention relates to an air conditioning system for industrial applications such as textile mills and to a method of operating the same, and, more particularly, to such an air conditioning system which may be operated during the winter season without utilizing a refrigeration machine thus providing so-called "free cooling."

A major problem existing in systems of this type resides in the fact that during winter operating conditions a mixture of outside and return air has been employed in an attempt to maintain desired conditions in the area being treated.

It is exteremely difficult to obtain accurate area control while modulating outside dampers and return air dampers in a central station. To eliminate this problem the present invention proposes to utilize chilled water rather than outside air damper controls thus providing an inherently more stable arrangement for one which is extremely unstable.

The chief object of the present invention is to provide an air conditioning system for industrial applications such as textile mills which will provide stable control of conditions within the area being treated, and which may be utilized to provide free cooling during winter operating conditions when the refrigeration machine is inoperative.

An object of the present invention is to provide an air conditioning system for industrial applications such as textile mills which utilizes chilled water control for effective control of conditions within an area being treated, and which utilizes cooling tower water during winter operating conditions to treat a stream of air being supplied to the area being treated.

A further object of the invention is to provide a method of operating an air conditioning system for industrial applications such as textile mills. Other objects of the invention will be readily perceived from the following description.

This invention relates to an air conditioning system for industrial application such as textile mills having selective summer and winter operating conditions comprising, in combination, an air washer, means in the washer for discharging a first stream of water into an air stream directed through the washer, means in said washer for collecting discharged water, a refrigeration system including a condenser and a cooler for treating the first stream, valve means for regulating the supply of water to the washer discharge means, a first circuit utilizable during summer operating conditions including the cooler, discharge means and collecting means for supplying water cooled in said cooler to said discharge means and for returning the water from the collecting means to the cooler, first pump means for passing the first stream of water through the first circuit, a cooling tower for cooling a second stream of water, a second circuit utilizable during summer operating conditions including said cooling tower and said condenser for supplying cooling water from the cooling tower to the condenser and for returning water from the condenser to the cooling tower, a second pump means for passing a second stream of water through the second circuit, and a third circuit utilizable during winter operating conditions including portions of the first circuit and the second circuit for supplying water treated by the cooling tower to the discharge means and for returning water from the collecting means to the cooling tower, the first pump means and the second pump means being utilized to pass water through the third circuit.

This invention further relates to a method of operating an air conditioning system for industrial applications such as textile mills in which the steps consist in circulating a stream of air through an area to be conditioned, spraying water in heat exchange relation with the air stream to treat the same, varying the quantity of water sprayed selectively in response to conditions in the area being treated, under summer operating conditions, circulating the stream of water through the cooler of a refrigeration machine to cool the water before passage in heat exchange relation with the stream of air to be treated, supplying a second stream of water through the condenser of the refrigeration machine and cooling the second stream of water after its passage through the condenser in a cooling tower, while, under winter operating conditions, discontinuing operation of the refrigeration machine, discontinuing passage of the second stream of water through the condenser of the refrigeration machine, discontinuing passage of the first stream of water through the cooler of the refrigeration machine, passing the first stream of water to be treated in heat exchange relation with exterior air in the cooling tower, spraying the treated stream of water in heat exchange relation with the circulated air stream and varying the quantity of water sprayed selectively in response to conditions in the area being treated.

The attached drawing is a diagrammatic view of an air conditioning system embodying the present invention.

Referring to the attached drawing, there is shown an air washer 2 for treating a stream of air to be supplied to an area of a textile mill for providing desired temperature and humidity conditions in that area. Air washer 2 includes a housing 3, in which is placed a fan 4 driven by a motor 5 serving to draw a stream of air from the area being treated through inlet 6 into the housing and to pass the stream of air through the housing to be treated, the treated stream of air being supplied to the area being conditioned.

Spray nozzles 9 are placed in housing 3 and are connected to a supply line 10 to pass treated water, as hereinafter explained, to nozzles 9 to be sprayed in heat exchange relation with the stream of air passing through the washer. A sump 11 collects sprayed water and is connected to a return line 12, as hereinafter explained. Following spray nozzles 9 there is placed a rotatable eliminator 13 which maybe rotated by the stream of air directed by fan 4. The construction of this rotatable eliminator is shown in Patent No. 2,932,360, granted April 12, 1960 and comprises essentially a hub having extending therefrom a plurality of blades comprising a plurality of surfaces intersecting in a plane or a conical surface, the outer periphery of the eliminator having enclosing means which have suitable sealing means associated therewith to prevent any bypass around the eliminator structure.

Preferably, a spray head 16 connected to a suitable source of steam is provided to discharge steam into air passing to the housing prior to the heat exchange relation with the water discharged from spray nozzles 9. Steam sprays 16 may increase the dewpoint and also the weight of moisture in the air depending upon desired conditions by heating the spray water. Similarly, if desired, a suitable heating coil 18 may be provided to temper the air after its passage through the sprays. If the air conditioning load in the area to be conditioned is not sufficient to decrease the humidity to a desired point or increase the temperature to a suitable temperature this condition may be remedied by a suitable application of heat by means of coil 18.

A refrigeration system indicated generally at 20 is provided to chill the stream of water being supplied to the spray nozzles 9. The refrigeration system consists of a compressor 21, a condenser 22, and a cooler 23 interconnected to cool water passing in heat exchange relation with refrigerant in cooler 23.

A second sump 24 divided into three compartments 25, 26, 27 is connected in the water circuits, as hereinafter explained, compartment 26 having two sections 26', 26''.

A first water circuit is provided to supply chilled water to the spray nozzles 9 under summer operating conditions. A pump 28 placed in supply line 29 withdraws water from compartment 25 of sump 24 and supplies the water through the cooler in heat exchange relation with refrigerant therein, the chilled water passing to supply line 10 for supply to spray nozzles 9. Valves 30 are placed in these lines to permit cooler 23 to be removed from the first water circuit. The bypass line 31 closed during summer operating conditions by valve 32 connects supply lines 10, 29, for a purpose hereinafter explained.

Return line 12 from sump 11 of air washer 2 discharges into compartment 27 of sump 24. Under summer operating conditions, water discharged in compartment 27 overflows a first weir 33 as indicated by line 37 into section 26'' and passes through a strainer 34 to section 26' of second compartment 26. Under summer operating conditions, water in section 26' of compartment 26 overflows into compartment 25 as indicated by line 38 and is withdrawn therefrom by pump 28 for passage to the cooler and to the spray nozzles 9.

A cooling tower 40 is provided to supply condensing water to the condenser 22 to liquefy refrigerant therein. Cooling tower 40 includes spray nozzles 41 which spray a stream of water in heat exchange relation with exterior air drawn into the tower through inlets 42 by fan 43, the exterior air being discharged through outlet 44 while cooled water collects in sump 45 and passes through outlet 46 to a supply line 47. Pump 47' forwards cooled water from sump 45 of cooling tower 40 through supply line 47 to condenser 22. The cooling water after passage through the condenser in heat exchange relation with refrigerant therein returns to the cooling tower through return line 48 and is discharged by spray nozzles 41 in heat exchange relation with air passing through the cooling tower.

A line 49 is provided to permit cooling water to bypass spray nozzles 41, the line being closed by a valve 50 controlled in response to temperature of cooled water leaving the cooling tower through supply line 47 or supply line 51 depending upon operation under summer or winter operating conditions. A valve 56 is placed in supply line 51 to permit the supply line to be closed during summer operating conditions. If desired, of course, valve 50 and bypass line 49 may be omitted and fan 43 cycled to regulate the temperature of cooling water.

A bypass line 53 connects supply line 47 and return line 48 to permit cooling water to bypass the condenser when desired. A valve 54 is placed in line 53. Valves 55 are placed in lines 47 and 48 to permit the condenser to be shutoff from cooling water supply.

A modulating valve 60 is placed in supply line 10 and regulates the quantity of chilled water passing to spray nozzles 9 of air washer 2 in response to the temperature of the air stream leaving air washer 2 and passing to the area to be treated. Valve 60 is regulated by a submaster thermostat 61 responsive to temperature of the discharged air stream leaving washer 2; thermostat 61 may be reset from master thermostat 62 responsive to temperature in the area being treated.

A bypass line 63 connects supply line 10 with section 26' of sump 24. A modulating valve 64 is placed in line 63 and is responsive to pressure in supply line 10 as indicated by pressurestat 65 to bypass water from supply line 10 through line 63 to section 26' of the sump. Thus, as pressure increases in supply line 10, due to closing of modulating valve 60, valve 64 tends to move toward an open position permitting water to bypass through line 63 to compartment 26.

A third circuit is provided for use during winter operating conditions when the refrigeration machine is inoperative; the third circuit includes portions of the first and second circuits described above. This third circuit permits water to be treated in the cooling tower 40 and supplied to the spray nozzles 9 of air washer 2 to treat the stream of air being directed through the air washer.

The third circuit includes supply line 51 from the cooling tower which discharges into compartment 25 of sump 24 during winter operating conditions as indicated by the dotted lines in compartments 25, 26, supply line 29, pump 28, bypass 31, and supply line 10 to spray nozzles 9. Return water from air washer 2 passes through return line 12 and is discharged in compartment 27 of sump 24, water overflowing from compartment 27 into compartment 26. A bypass line 70 having a valve 71 therein connects section 26' of compartment 26 of sump 24 with supply line 47. A valve 72 is placed between the juncture of lines 70 and 47. Pump 47' passes water from compartment 26 through supply line 47, bypass 53, and return line 48 to the cooling tower 40, the water being discharged from spray nozzles 41 in heat exchange relation with exterior air being passed through the cooling tower. The cooled water then passes through supply line 51, valve 56 being open and valve 72 closed, and is discharged in compartment 25 of sump 24, being withdrawn from compartment 25 by chilled water pump 28. The excess water from compartment 25 overflows into section 26' of compartment 26 and is withdrawn by pump 47' and returned to the cooling tower.

In order to maintain a desired temperature of cooling water leaving the cooling tower, bypass line 49 is provided. Valve 50 in line 49 is modulated in response to the temperature of chilled water leaving the cooling tower through line 51 or line 47 to determine the quantity of cooling water bypassing sprays 41 under summer or winter operating conditions.

Under summer operating conditions, air is directed through air washer 2 to be treated by heat exchange relation with chilled water sprayed therein. If desired, of course, depending upon circumstances, the air may be preheated by the discharge of steam therein or may be reheated after passage through the sprays to provide desired temperature and humidity conditions in the area. Throughout the figure, valves marked "S" are open during summer operating conditions and closed during winter operating conditions while valves marked "W" are closed during summer operating conditions and open during winter operating conditions.

Water is drawn from compartment 25 of sump 24 through line 29 by pump 28 passed through cooler 23 and supply line 10 to the sprays 9 of washer 2. Water discharged in the air stream is collected in sump 11 and returns to compartment 27 of sump 24 through return line 12. The water overflows weir 33, passes through strainer 34, overflows weir 35 into section 26' and overflows weir 36 into compartment 25 where it is again withdrawn by pump 28 through line 29. It will be appreciated that valves 30 are open and valve 31 is closed when chilled water is directed to the cooler.

At the same time, cooling water from cooling tower 40 passes through supply line 47, valve 72 being open and valve 56 being closed, and is forwarded by pump 47' to the condenser 22, valves 55 being open and valve 54 being closed. The cooling water condenses refrigerant in the condenser and returns through line 48 to the cooling tower where it is again sprayed in heat exchange relation with the exterior air.

Valve 60 regulates the quantity of chilled water passing to the sprays 9 through supply line 10. If excessive pressure builds up in supply line 10, such pressure is reflected by pressurestat 65 to modulate valve 64 to permit some portion of the chilled water to bypass the air washer through line 63 and return to sump 24.

Under winter operating conditions, valves marked "S" are closed and valves marked "W" are open. Thus, water supplied to the sprays 9 pass through the third circuit. Pump 28 withdraws water from compartment 25 of sump 24 and forwards the water through supply line 29, bypass 31 and supply line 10 to the sprays 9. Water returns from the sump 11 of washer 2 through return line 12 to compartment 27 of sump 24. The return water overflows weir 33 and weir 35 into section 26' of compartment 26. The water leaves compartment 26 through bypass 70, valves 71 being open and valve 72 being closed, and is supplied by pump 47' through supply line 47, bypass 53, and return line 48 to the cooling tower 40.

Water cooled in the cooling tower 40 collects in the sump 45 thereof and leaves the cooling tower through line 51, valve 56 being open and valve 72 closed, and is supplied to compartment 25 of sump 24. Thus, pumps 28 and 47' are utilized in the third or winter circuit to supply cooling water to the sprays 9 of air washer 2.

If pressure in supply line 10 increases, the increased pressure is reflected by pressurestat 65 which modulates valve 64 to bypass some portion of the water in supply line 10 through bypass 63 to compartment 26 of sump 24.

The temperature of water supplied from the cooling tower to compartment 25 of sump 24 is regulated by means of bypass 49 and valve 50. Valve 50 in response to the temperature of cooling water leaving the cooling tower through supply line 51 modulates the amount of water passing through bypass 49 and not supplied to the sprays of the cooling tower.

While I have described the present invention in connection with the supply of water to the sprays of a single air washer, it will be appreciated that a number of air washers may be employed in an air conditioning system and that the chilled water may be supplied to the air washers in parallel, returning through a common return line, if desired, to sump 24.

If desired, during summer operating conditions, make-up water may be added to the chilled water circuit at sump 24 and condensing water added to the condensing water circuit at cooling tower 40; during winter operating conditions, it is only desirable to add make-up water if required at sump 24.

The present invention provides an economical air conditioning system for industrial applications, such as textile mills, in which stable control is provided throughout summer and winter operating conditions. The system of the present invention provides what is in effect free cooling of the chilled water during winter operating conditions, thereby considerably reducing initial costs of the system.

While I have described a preferred embodiment of the invention, it will be understood the invention is not limited thereto since it may be otherwise embodied within the scope of the following claims.

I claim:

1. In an air conditioning system for industrial applications such as textile mills having selective summer and winter operation, the combination of an air washer, means in said air washer for discharging a first stream of water into an air stream directed through the washer, means in said washer for collecting discharged water; a refrigeration machine including a condenser and a cooler for treating the first stream; valve means for regulating the supply of water to said washer discharge means; a first circuit utilizable during summer operating conditions including said cooler, discharge means and collecting means for supplying water cooled in said cooler to said discharge means and for returning water from said collecting means to said cooler, first pump means for passing the first stream of water to the first circuit; a cooling tower for cooling a second stream of water; a second circuit utilizable during summer operating conditions including said cooling tower and said condenser for supplying cooling water from the cooling tower to the condenser and for returning water from the condenser to the cooling tower, second pump means for passing a second stream of water through the second circuit; and a third circuit utilizable of the first circuit and the second circuit for supplying water treated by the cooling tower to the washer discharge means and for returning water from the washer collecting means to the cooling tower, said first pump means and said second pump means being utilized to pass water through the third circuit.

2. An air conditioning system according to claim 1 in which means are provided for heating air passing through the air washer prior to the discharge of the first stream of water into the air stream.

3. An air conditioning system according to claim 1 in which means are provided for heating air after the stream of air has passed in heat exchange relation with the discharged stream of water.

4. An air conditioning system according to claim 1 including a sump forming a portion of the three circuits, a bypass line connecting the washer discharge means supply line with the sump, and means in the bypass line responsive to pressure in the supply line for bypassing water in the supply line to said sump.

5. An air conditioning system according to claim 4 in which the cooling tower includes spray means, a supply line forming a portion of the second circuit connected to the spray means, a bypass line bypassing the spray means, and control means in said bypass line responsive to temperature of cooling water leaving the cooling tower for bypassing water about the spray means.

6. An air conditioning system according to claim 1 in which the cooling tower includes spray means, a supply line forming a portion of the second circuit connected to the spray means, a bypass line bypassing the spray means, and control means in said bypass line responsive to temperature of cooling water leaving the cooling tower for bypassing water about the spray means.

7. In an air conditioning system for industrial applications such as textile mills having selective summer and winter operation, the combination of an air washer, means for passing an air stream through the washer, means for spraying a first stream of water into the air passing through the washer, a sump in said washer for collecting sprayed water; a refrigeration machine including a condenser and a cooler for treating the first air stream; a supply line connecting the cooler with the spray means, valve means in the supply line responsive to the temperature of treated air leaving the washer to vary the quantity of cooled water supplied to the spray means; a second sump having first, second and third compartments, a return line connecting the washer sump with the third compartment of the second sump, a second supply line connecting the first compartment of the second sump with the cooler to supply water from the second sump to the cooler, pump means for supplying water from the sump through the cooler to the supply means, a bypass line connecting the first supply line and the second supply line, valve means in said bypass line and valve means for shutting off the cooler from the supply lines; a cooling tower, a third supply line connecting the cooling tower with the condenser, a second return line connecting the condenser with the cooling tower, second pump means for supplying water from the cooling tower through the third supply line to the condenser and for returning the cooling tower water from the condenser to the cooling tower, a second bypass line connecting the third supply line and a second return line, valve means in said second bypass line, valve means for shutting off the condenser from the third supply line, and the second return line; a line connecting the second compartment of the sump with the third supply line, valve means in said line, valve means in the third supply line placed between the cooling tower and the connection to said sump line; a fourth supply line connecting the cooling tower with the first compartment of the sump, and valve means in said fourth supply line, whereby, during summer operating conditions, water is supplied from the first compartment of the second sump through said second supply line to said cooler, chilled water being supplied from the cooler through the first supply line to the spray means and being returned from the washer sump to the third compartment of the second sump and cooling water is supplied from the cooling tower through the third supply line to the condenser and returned to the cooling tower through the second return line, while, under winter operating conditions, water is supplied from the first compartment of the second sump through the second supply line, first bypass line and first supply line to the spray means, water returning from the washer sump to the third compartment of the second sump and overflowing into the second compartment, water being withdrawn from the second compartment of the second sump through the connecting line to the third supply line and passed through the third supply line, the second bypass line and the second return line to the cooling tower, cooled water flowing from the cooling tower through the fourth supply line to the first compartment of the second sump.

8. An air conditioning system according to claim 7 including a bypass line connecting the first supply line with the second compartment of the second sump and means responsive to pressure in the first supply line to regulate passage of water through said bypass line.

9. An air conditioning system according to claim 8 including spray means in the cooling tower to discharge water to be cooled in heat exchange relation with air passing through the tower, said spray means being connected to the second return line, and a bypass to bypass water about the tower spray means, and valve means in said bypass line responsive to temperature of water in the fourth supply line.

10. In the method of operating an air conditioning system for industrial applications such as textile mills, the steps which consist in circulating a stream of air through an area to be conditioned, spraying water in heat exchange relation with the air stream to treat the same, varying the quantity of water sprayed selectively in response to conditions in the area being treated; under summer operating conditions, circulating the stream of water through the cooler of a refrigeration machine to cool the water before passage in heat exchange relation with the stream of air to be treated, supplying a second stream of water through the condenser of a refrigeration machine, and cooling the second stream of water after its passage through the condenser in a cooling tower; while, under winter operating conditions, discontinuing operation of the refrigeration machine, discontinuing passage of the second stream of water through the condenser of the refrigeration machine, discontinuing passage of the first stream of water through the cooler of the refrigeration machine, passing the first stream of water to be treated in heat exchange relation with exterior air in the cooling tower, spraying the treated stream of water in heat exchange relation with the circulated air stream and varying the quantity of water sprayed selectively in response to conditions in the area being treated.

11. A method of operating an air conditioning system according to claim 10 under winter operating conditions including the step of bypassing some portion of the first stream of water from heat exchange relation with the exterior air in the cooling tower to maintain a desired temperature of water leaving the cooling tower.

12. A method of operating an air conditioning system according to claim 10 including the step of bypassing some portion of the treated stream of water about the air washer in response to pressure in the water supply line.

13. A method of operating an air conditioning system according to claim 10 including the steps of heating the air stream prior to its passage in heat exchange relation with the sprayed water and heating the air stream after its passage through the sprayed water.

References Cited by the Examiner

UNITED STATES PATENTS

| | | | |
|---|---|---|---|
| 1,895,444 | 1/1933 | Cassell | 165—60 |
| 2,359,624 | 10/1944 | Crawford | 165—21 |
| 2,555,528 | 6/1951 | Angeloney | 165—20 |
| 2,953,355 | 9/1960 | Hurgate | 165—20 |
| 3,186,183 | 6/1965 | Murdoch | 62—183 |

ROBERT A. O'LEARY, *Primary Examiner.*

CHARLES SUKALO, *Examiner.*